Sept. 22, 1959     T. A. RATKOWSKI     2,904,908
DIPPER TEETH
Filed July 14, 1955     4 Sheets-Sheet 1
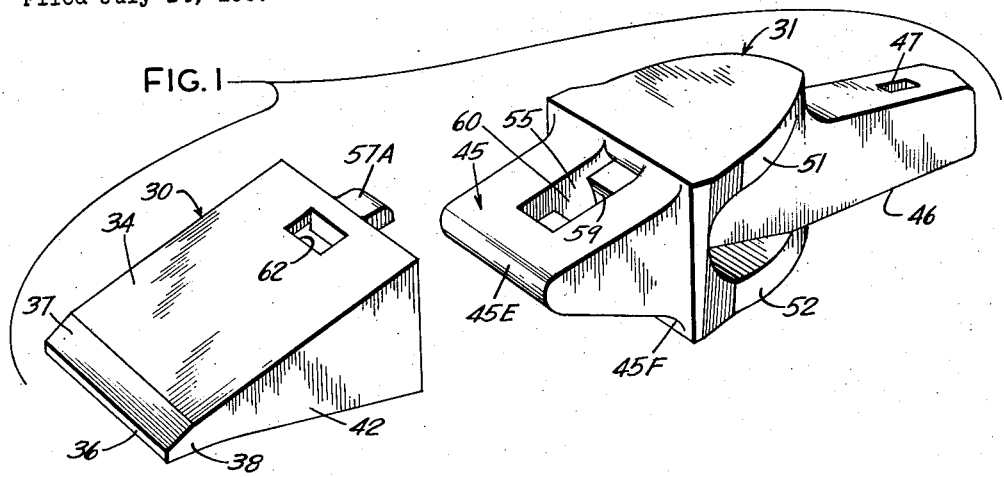
FIG. 1
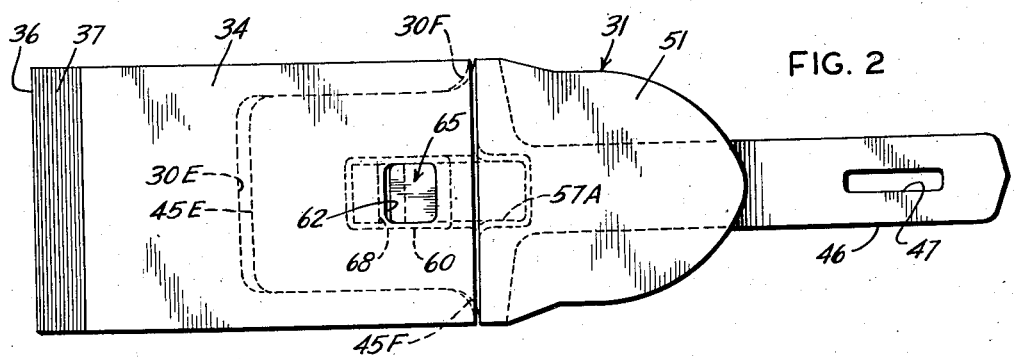
FIG. 2
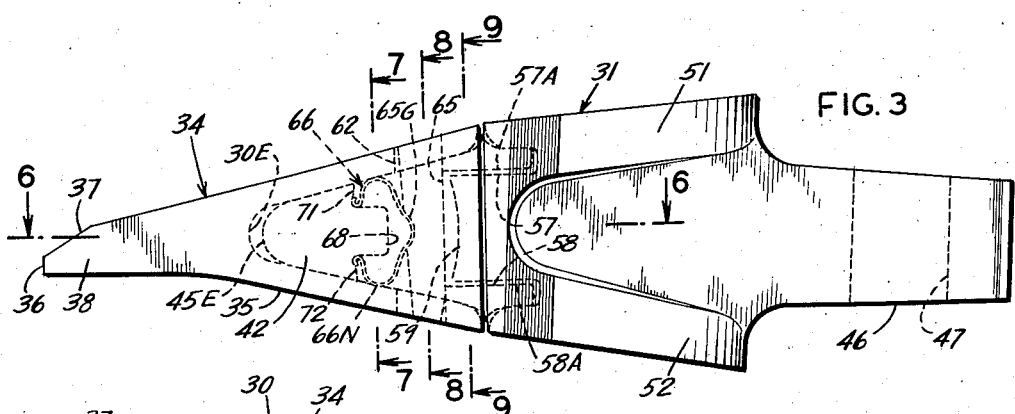
FIG. 3
FIG. 4
INVENTOR.
THOMAS A. RATKOWSKI
BY
Wallace and Cannon
ATTORNEYS Sept. 22, 1959     T. A. RATKOWSKI     2,904,908
DIPPER TEETH
Filed July 14, 1955     4 Sheets-Sheet 2
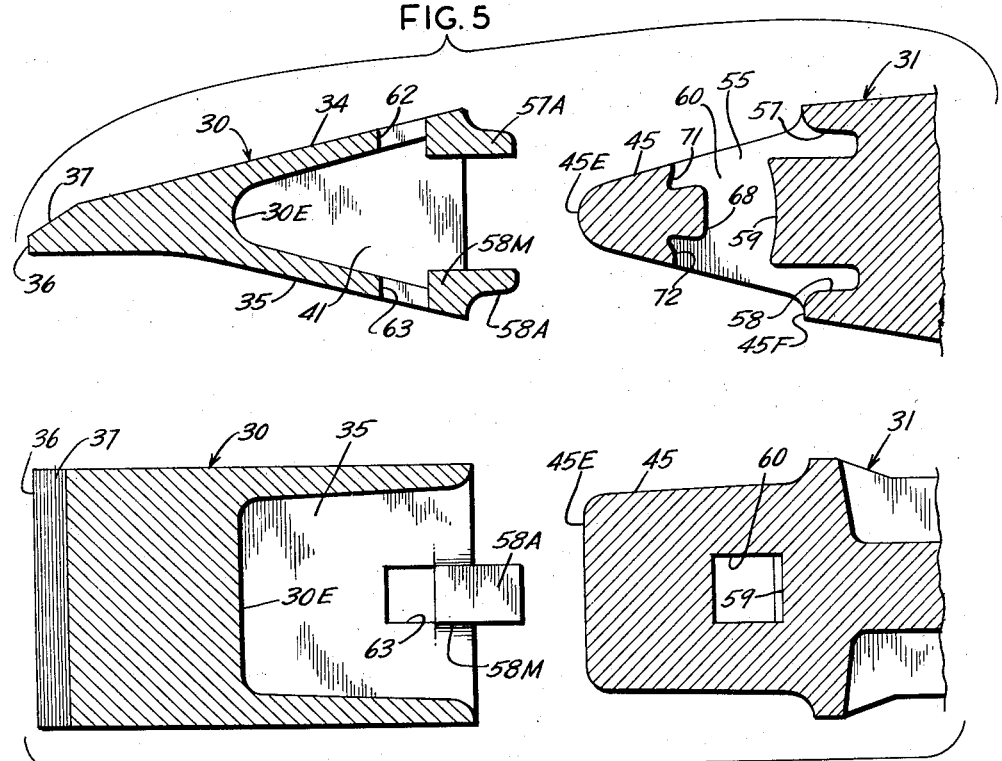
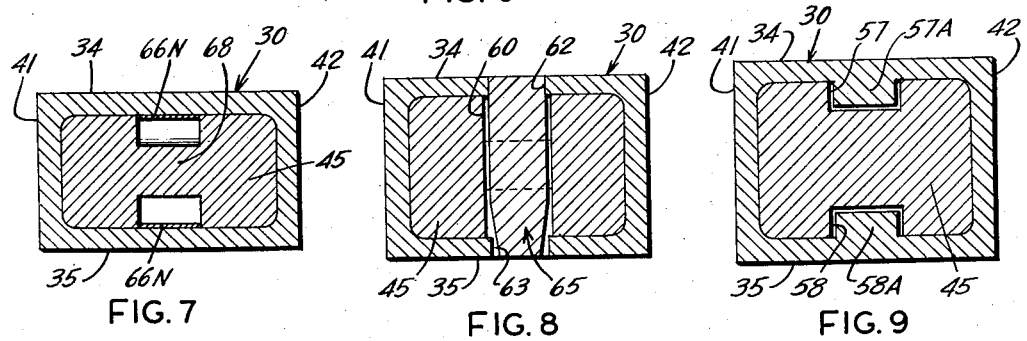
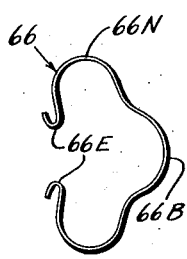
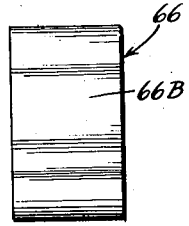
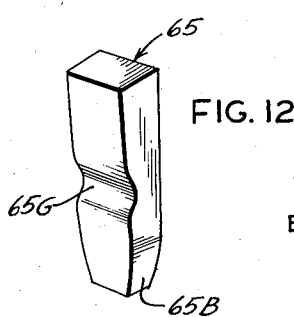
INVENTOR.
THOMAS A. RATKOWSKI
BY
Wallace and Cannon
ATTORNEYS Sept. 22, 1959     T. A. RATKOWSKI     2,904,908
DIPPER TEETH Filed July 14, 1955     4 Sheets-Sheet 3

INVENTOR.
THOMAS A. RATKOWSKI
BY Wallace and Cannon
ATTORNEYS

Sept. 22, 1959     T. A. RATKOWSKI     2,904,908
DIPPER TEETH
Filed July 14, 1955     4 Sheets-Sheet 4
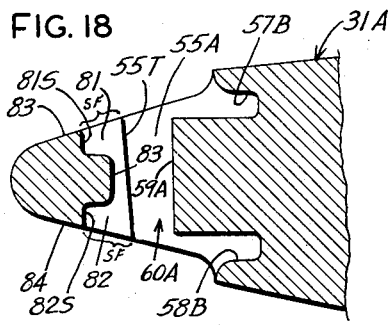
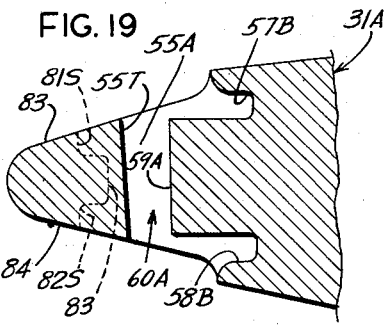
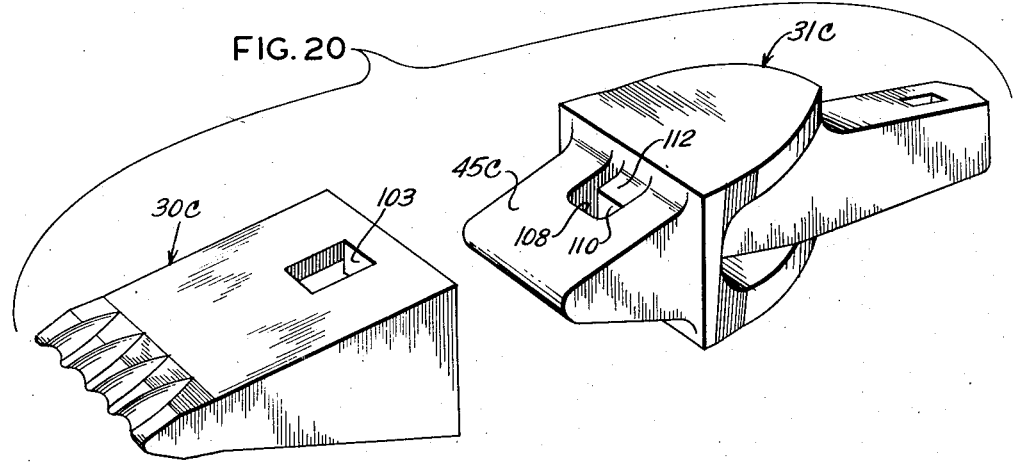
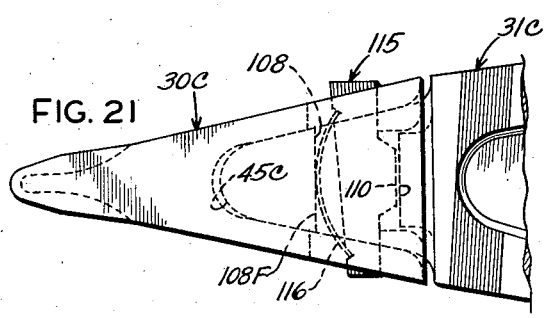
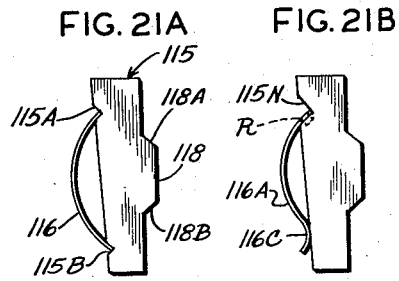
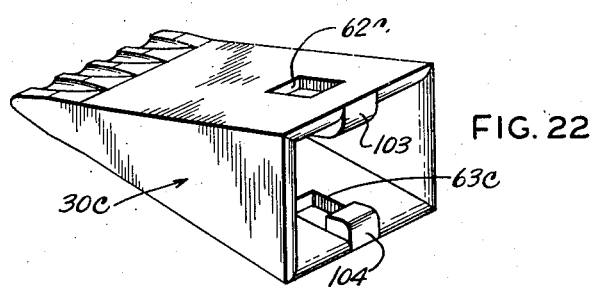
INVENTOR.
THOMAS A. RATKOWSKI
BY
*Wallace and Cannon*
ATTORNEYS

United States Patent Office 2,904,908
Patented Sept. 22, 1959

2,904,908
DIPPER TEETH

Thomas A. Ratkowski, Chicago Heights, Ill., assignor to American Brake Shoe Company, New York, N.Y., a corporation of Delaware Application July 14, 1955, Serial No. 522,050

9 Claims. (Cl. 37—142)

This invention relates to a dipper tooth for excavating equipment.

Dipper teeth such as those which are projectably mounted on the lip of an excavating shovel or the like are sometimes in the form of a hollow cap or so-called point removably mounted on an adapter which in turn includes a shank for attachment to the excavating shovel, this construction enabling the adapter to be repointed when the cap becomes unduly worn. There have been various proposals set forth with respect to the way in which the cap is to be retained on the adapter, inasmuch as it is essential that the point be prevented from shifting or rolling on the adapter during operation of the shovel.

Among the retainers proposed have been pins that are to be passed horizontally transversely through aligned ways in the cap and the adapter. In some instances a coil spring is used to hold the pin in position, and relatively complicated construction is required for housing the spring. Moreover, extensive effort is required to assemble and disassemble the tooth, and for this reason such retainers have not been found altogether satisfactory.

Other proposals for retaining the cap on the adapter have entailed a pin inserted in transverse horizontal grooves afforded respectively in the top of the cap and the top of the adapter which are designed to mate and afford a key-way when the cap is on the adapter, and it has been proposed to afford a resilient element to hold the pin within such a key-way. In an arrangement of this kind, neither the groove in the cap nor the groove in the adapter is closed on all sides, and this accounts for a tendency of the pin to work loose or allow movement of the cap relative to the adapter. Retainers of this kind are not readily permissive of reversible points, whereas it is desirable that the retainer resorted to be of a kind enabling this to be accomplished.

Still other proposals have involved a pin that is to be passed vertically through openings in the cap and a key-way in the adapter, and in this connection it has been proposed that the pin be engaged by a coil spring or a compressible rubber boss in the adapter tending to apply an unbalanced rearward torque to the end of the pin reposed in the upper opening of the cap. While such serves in some measure to pull the top of the cap up on the adapter, it will recognized that this force applied at the top of the pin tends at the same time to turn the opposite end of the pin in a forward direction.

In view of the foregoing, the primary object of the present invention is to removably mount the cap of a dipper tooth on the adapter by a pin located in a vertical key-way afforded by aligned openings at the vertical center plane of the cap and adapter, the pin being retained or held in position by a leaf spring in such a manner that the action of the spring is equally distributed accounting for uniform forces holding the cap to the adapter. Yet more specifically, it is an object of the present invention to assure that the aforementioned spring acts on the pin in such a manner as to pull the cap up on the adapter with equal force at the top and bottom of the cap as afforded by a rearward compressive force distributed equally with respect to the pin along the horizontal center line of the cap and adapter.

More specifically, it is an object of the present invention to enable the point of a dipper tooth to be removably and reversibly held on the adapter in an effective manner by a separable pin and leaf spring of relatively uncomplicated arrangement so that individual mounting and dismounting of the parts may be accomplished with facility.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is an exploded perspective of one form of cap and adapter contemplated by the present invention;

Fig. 2 is a plan view showing the cap and adapter of Fig. 1 in assembled relation;

Fig. 3 is a side elevation of the assembly shown in Fig. 2;

Fig. 4 is a perspective view of the cap;

Fig. 5 is a vertical sectional view, partly broken away, of the cap and adapter in disassembled relation;

Fig. 6 is a horizontal sectional view, partly broken away of the cap and adapter in disassembled relation, being taken on the line 6—6 of Fig. 3;

Figure 13:
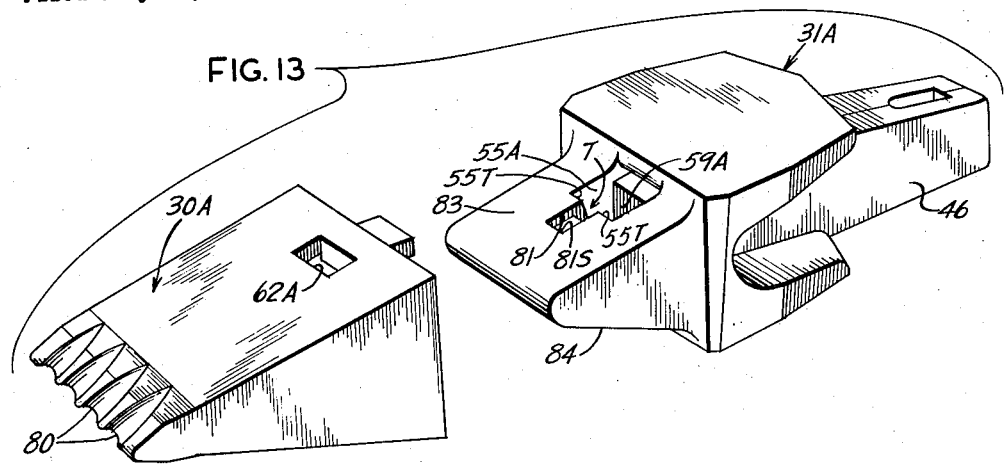
Figure 14:
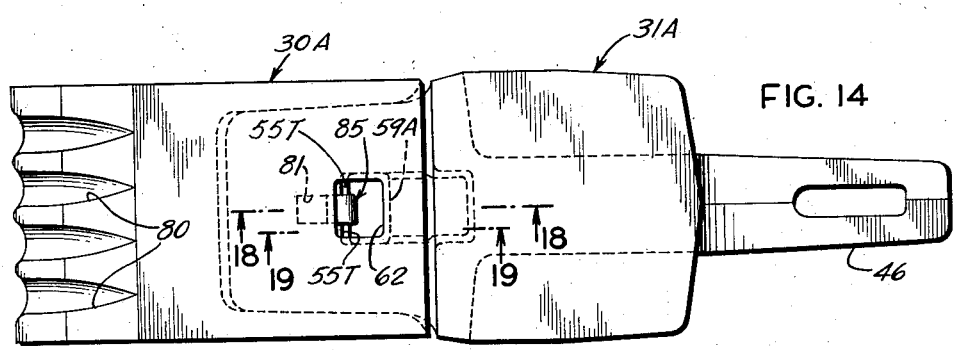
Figure 15:
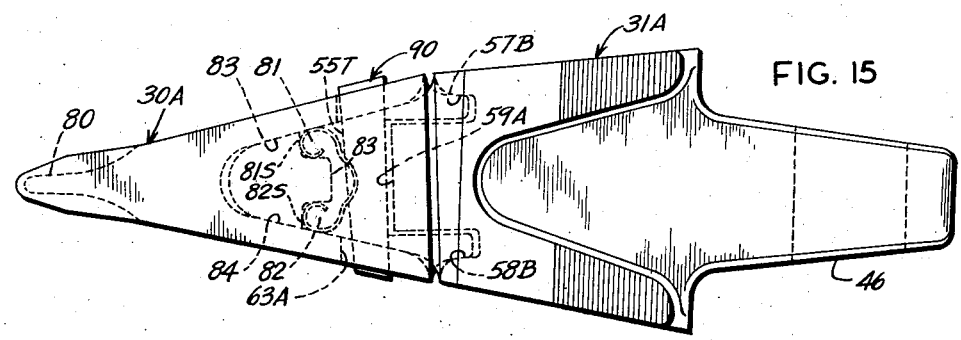
Figure 16:
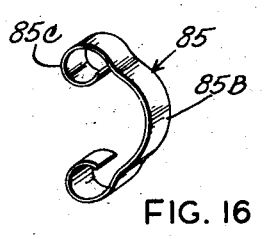
Figure 17:
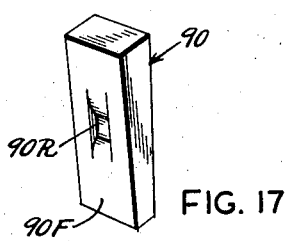

Figs. 7, 8, and 9 are sectional views taken substantially and respectively on the lines 7—7, 8—8 and 9—9 of Fig. 3;

Fig. 10 is a side elevation of a leaf spring;

Fig. 11 is a rear elevation of the leaf spring;

Fig. 12 is a perspective view of a pin;

Fig. 13 is an exploded perspective of another form of cap and adapter contemplated by the present invention;

Fig. 14 is a plan view of the assembled parts shown in Fig. 13 in assembled relation;

Fig. 15 is a side elevation of the dipper tooth shown in Fig. 14 showing the retainer pin in position;

Fig. 16 is a perspective view of the leaf spring used with the dipper tooth of Figs. 14 and 15;

Fig. 17 is a perspective view of the pin used with dipper tooth of Figs. 14 and 15;

Figs. 18 and 19 are partial sections of the adapter taken substantially on the lines 18—18 and 19—19 of Fig. 14;

Fig. 20 is an exploded perspective of a further modification;

Fig. 21 is a partial side elevation of the assembled parts shown in Fig. 20;

Figs. 21A and 21B are elevations of pins including a leaf spring; and

Fig. 22 is a perspective view of a point or cap.

The dipper tooth illustrated in Figs. 1 to 12 includes a wedge-shaped cap or so-called point 30 that is to be removably and reversibly mounted on an adapter 31. As shown in Fig. 5, the cap 30 includes spaced apart flat upper and lower walls 34 and 35 that converge in a forward direction to afford a digger point 36, Fig. 1, and in this instance the digger point is provided with the chamfered upper edge 37 and an opposed lower edge portion 38 inclined downwardly at an angle to the plane of the lower wall 35 as shown in Fig. 3. Such construction of the lower edge portion of the digging point of the tooth affords in effect what constitutes surplusage metal so that as the digging point becomes worn the cap may be removed from the adapter and reversed face for face as is well known in the art.

The cap 30 in the present instance also includes parallel spaced apart side walls 41 and 42 of triangular shape cast integral with the upper and lower walls 34 and 35. The divergent spacing between the inner faces of the upper and lower walls 34 and 35 affords a forwardly tapered rearwardly opening socket enabling the cap to be mounted tightly on a complementary wedge-shaped nose 45 of the usual kind projecting forwardly at the front of the adapter 31, the depth of the socket in the cap 30 included between the walls 34 and 35 corresponding substantially to the length of the adapter nose. The base of the adapter nose 45 is filleted at 45F and the base of the cap is likewise filleted at 30F. These filleted surfaces are normally in spaced relation when the cap is on the adapter as shown in Figs. 2 and 3 for a purpose to be described.

The adapter 31 includes an elongated rearwardly extending shank 46 formed with a vertical opening 47 utilized for mounting the dipper tooth on the dipper in the usual manner, and intermediate the nose 45 and the shank 46 are spaced apart upper and lower overhanging flanges 51 and 52 which when the tooth is mounted in operative position fit around edge portions of the dipper lip.

It will be recognized that both the cap and adapter are one-piece castings of manganese steel or like ferrous alloy having high resistance to wear and impact, and during the casting operation the nose of the adapter in accordance with the present invention is cored to provide a recess 55, Fig. 1, extending vertically therethrough from one face to the other. Opening into the recess 55 are a pair of spaced apart upper and lower rearwardly extending sockets 57 and 58, Fig. 5, having dead ends within the body of the adapter, and these sockets are adapted to receive rearwardly projecting tangs or lugs 57A and 58A cast medially at the rear edges of the upper and lower walls 34 and 35 of the cap 30. These lugs include portions as 58M, Fig. 4, that extend inwardly of the inner faces of the upper and lower walls of the cap and where lugs of this kind are provided such assure rigidity between the point and the adapter, but lugs not inclusive of rearwardly projecting portions may be used for this purpose as will be described.

As shown in Fig. 3, the tangs 57A and 58A when the cap is on the adapter extend back into the sockets 57 and 58 and normally terminate short of the dead ends thereof. This relation is attained by dimensioning the parts so that when the cap is on the adapter the forward rounded apex 45E of the nose 45 is normally spaced from the forward rounded apex 30E of the socket in the cap as shown in Fig. 3, enabling take-up or creep to occur during extended use of the tooth to the extent that the filleted surfaces 30F and 45F finally mate.

Projecting forwardly medially between the mounting sockets 57 and 58 is a relatively large boss 59, Figs. 1 and 5, and the end of this boss defines the rear wall of a vertical key-way 60, Figs. 6 and 8, within the nose of the adapter. The cap 30 includes openings 62 and 63, Fig. 5, in the upper and lower walls thereof, respectively, which when the cap is on the adapter register with the key-way 60 as shown in Fig. 8. The lugs 57A and 58A extend forwardly into the socket in the cap 30 to the extent that the forward ends of these lugs are common to the rear walls of the openings 62 and 63 as is apparent in Figs. 1 and 4.

To hold the cap on the adapter in accordance with the present invention, a pin 65 of the kind shown in Fig. 12 is to be passed downwardly through the upper of the openings in the cap 30 aligned with key-way 60 to the extent that the upper and lower ends of the pin 65 repose in the upper and lower openings 62 and 63 in the cap 30, and a generally C-shaped leaf spring 66 of the kind shown in Figs. 10 and 11 is disposed within the recess 55 in the adapter to act between the forward face of the pin and a vertical portion within the adapter forwardly thereof to hold the cap on the adapter as will be described.

To enable the foregoing to be achieved in accordance with the present invention, a rearwardly projecting mounting boss 68 is cast medially on the front wall of the recess 55 within the adapter at the center line thereof thus defining in effect the front wall of the key-way 60. The boss 68, as shown in Fig. 5, is of reduced thickness relative to the depth of the recess 55 such as to afford a rearwardly facing vertical portion within the adapter in the form of identical upper and lower shoulders 71 and 72 forwardly of the pin 65 in the key-way. The leaf spring 66 is of relatively strong characteristics in so far as compressive strength is concerned, and this spring is preferably formed to include reversely bent end portions as 66E, Fig. 10, intermediate outwardly curved nodal portions as 66N and a rearwardly curved arcuate back portion 66B, the relation being such that the spring is symmetrical in shape. The shoulders 71 and 72 are exposed at either face of the nose of the adapter, and the ends 66E of the spring 66 are spaced apart sufficiently to enable the spring to be mounted on the boss 68 with the free end portions thereof abutting these vertical portions 71 and 72 as shown in Fig. 3.

The spring 66 is first mounted in this manner on the boss 68 within the recess 55 of the adapter independently of the pin 65 and when so positioned the arcuate back 66B thereof projects rearwardly beyond the boss 68 well into the key-way 60. The cap is next positioned on the adapter with the openings 62 and 63 thereof registered with the key-way 60, whereupon the pin 65 which is a separable part with respect to the spring 66 is driven downwardly through the upper opening 62 in the cap 30 with sufficient impact to drive the pin 65 past the portion 66B of the spring 66 projecting into the key-way. The end of the pin 65 opposite the end to be impacted may be provided with beveled edges as 65B which facilitate positioning and insertion of the pin.

As shown in Fig. 12, the pin 65 in the forward face thereof is formed with a transverse groove 65G, and when the pin 65 is first positioned for insertion into the key-way 60, the groove 65G is faced in a forward direction. Accordingly, impact delivered to the pin 65 forces the pin downwardly through the key-way to the extent that the arcuate back 66B of the spring 66 seats in the groove 65G, and this accurately positions the pin 65 with the upper and lower ends thereof reposed, respectively, in the upper and lower openings 62 and 63 in the cap 30. When the spring 66 has thus been operatively compressed between the forward face of the pin and the vertical portion in the adapter afforded by the aligned shoulders 71 and 72 forwardly of the pin, the spring 66 assumes the entire load of retention and is placed under high compression, and a portion of the resultant force in this instance is exerted rearwardly against the medial portion of the pin 65 defined by the groove 65G therein such that the opposite ends of the pin are held with equal force against the rear walls of the respective openings 62 and 63 in the tooth cap. At the same time, the end portions 66E of the leaf spring exert a resultant forward force against the correspondingly paired shoulders 71 and 72 within the adapter thus serving to pull the cap 30 fully up on the nose 45.

It is also to be noted that when the spring 66 is thus placed under compression by the pin 65 as aforesaid, the nodal portions 66N are expanded or pressed outwardly against the portions of the upper and lower walls of the cap 30 that overlie these nodal portions of the spring 66. Accordingly, it will be seen that under and in accordance with the present invention, the main force of the spring is applied against the pin along the horizontal center plane of the cap and the adapter, such being effective with respect to said center plane to equally distribute retaining forces of substantial magnitude against the pin, the adapter and the cap.

To release the pin, it is merely necessary to punch sharply the lower end thereof, and in this connection it will be noted that the pin 65 is preferably wedge-shaped as best shown in Fig. 3 to aid in accurate insertion from top to bottom within the key-way 60.

The cap 30 is fully reversible in that all parts are symmetrical enabling the cap to be removed from the adapter 31 and reversed face for face to present a new digging point when the lower edge 38 becomes dull. Such is attained by arranging the openings 62 and 63 on a true vertical line correspondingly as the key-way 60, and by having the nose of the adapter and the socket in the cap or point in the form of an isosceles triangle with the boss 68 located along the center line or perpendicular thereof. It will be recognized from the description to follow that these same advantageous relations are embodied in the modifications to be described below.

A modified form of the invention is shown in Figs. 13 to 17 including a pin to be described insertable in a key-way in the adapter held in place by a leaf spring acting between the forward face of the pin and a vertical portion within the adapter forwardly thereof. Inasmuch as the structural features of the cap and the adapter generally conform to what has been described above, a detailed description will be set forth only with respect to those parts that are of a different nature.

Thus, the adapter cap, 30A in this instance, is identical to what has been described above, except that for purposes of disclosure the cap 30A is shown as provided with spaced apart longitudinal grooves 80 in accordance with my prior Patent 2,247,202, such imparting prolonged life to the digging point of the cap.

The adapter 31A include a recess 55A, Fig. 13, in the nose thereof which is of less longitudinal dimension as compared to the recess 55, and the forward wall of the recess 55A is split to have two shoulders inclined rearwardly from top to bottom as shown at 55T in Figs. 13, 14 and 15 for a purpose to be described. The shoulders 55T afford the front wall or bounding portion of a key-way 60A, Figs. 18 and 19, and the rear wall or bounding portion of this key-way is afforded by a boss 59A which is similar to the boss 59 described above. Spaced apart upper and lower rearwardly extending sockets 57B and 58B, Fig. 19, in the adapter open in to the recess 55A, and these are dimensioned to receive the tangs that project rearwardly from the back of the cap as shown in Fig. 15.

A slot formation SF, Fig. 18, including a pair of relatively narrow spaced apart horizontal slots 81 and 82, Figs. 13 and 15, is formed in the upper and lower faces 83 and 84, respectively, of the nose of the adapter 31A. The slot formation including the slots 81 and 82 is more narrow in width than and extends forwardly from the key-way 60A, being in communication with the key-way through a throat T, Fig. 13, which has the narrow width of the slot formation. The slot formation terminates substantially at the medial portion of the nose of the adapter 31A to afford a vertical bounding portion within the adapter in the form of a pair of relatively short vertical shoulders 81S and 82S, Figs. 15 and 18, which are exposed at the upper and lower faces of the nose of the adapter 31A. The spacing between the bottom portions of the slots 81 and 82 defines a boss 83 that projects rearwardly along the horizontal center line of the adapter in the direction of the tapered key-way shoulders 55T located at opposite sides of the throat T, and as shown in Fig. 18 the boss 83 terminates short of the shoulders 55T and short of the throat T so as to be wholly confined in the slot formation. A leaf spring 85, Fig. 16, is adapted to be mounted on the boss 83 independently of the retainer pin to be described, and includes upper and lower convolute end portions 85C and an arcuate back portion 85B. The spring 85 in this instance is of relatively narrow dimension as compared to the spring 66 so as to fit in the slots 81 and 82 serving to confine the side edges thereof with the convolute end portions 85C disposed against the vertical bounding portion within the adapter afforded in this instance by the respective shoulders 81S and 82S as shown in Fig. 15.

The spring 85 is first mounted on the boss 83 in the nose of the adapter, and under this condition the back portion 85B thereof projects for a substantial amount beyond the throat T and wall 55T into the key-way 60A as shown in Fig. 14. The cap is then mounted on the tapered nose of the adapter with the openings as 62A and 63A, Figs. 13 and 15, in the upper and lower walls thereof registered with the key-way 60A, and when this assembly has been completed the tooth is adapted to receive a tapered retainer pin 90, Fig. 17, for pulling the cap up on the adapter.

The pin 90 includes a forward face 90F that is tapered complementary to the forward bounding wall 55T of the key-way 60A, and the dimensions are further such that when the pin 90 is in position in the key-way 60A the forward tapered face along the marginal side edges thereof engages the tapered shoulder 55T which has parts of the same dimension located on opposite sides of the throat T as clearly shown in Fig. 13, and the opposite end portions of the pin along the rear side thereof engage the rear walls of the openings as 62A and 63A in the upper and lower walls of the cap 30A. During driving of the pin 90, such occurs progressively pulling the cap up on the adapter.

A relatively narrow vertical recess 90R is formed medially in the forward face of the pin 90 serving as a seat for the arcuate back portion 85B of the spring 85 projecting into the key-way. The pin 90 which is separable with respect to the spring 85 is first positioned with the tapered forward face 90F thereof facing in the direction of the point of the cap, whereupon the upper end of the pin 90 is impacted and driven wedgingly downwardly into the key-way 60A until the pin is fully set in the key-way with the arcuate back portion 85B of the compressed spring 85 fitting into the recess 90R of the pin. When this condition has been attained, the pin 90 has been driven fully home with the tapered forward face thereof wedgingly abutting the complementary wall 55T of the key-way 60A and the upper and lower ends thereof reposed in the corresponding openings 62A and 63A in the upper and lower walls of the tooth cap. The spring 85 thus being under compression between the forward face of the pin and the vertical slot-formation-bounding portion within the adapter forwardly thereof holds the ends of the pin 90 firmly against the rear walls of the openings as 62A in the tooth cap. At the same time, the convolute end portions of the spring are pressed and bear with substantial force forwardly against the vertical portion within the adapter afforded by the shoulders 81S and 82S and also are pressed outwardly against the forward marginal portions of the upper and lower walls of the tooth cap adjacent the openings therein and which overlie the slots 81 and 82. These forces are, of course, as in the foregoing embodiment equally distributed with respect to the center plane of the cap and the adapter.

In the foregoing embodiments of the present invention, it will be observed that the cap includes rearwardly projecting lugs or tangs adapted to fit into corresponding sockets in the adapter. These may be omitted if desired as may also the side walls of the cap, inasmuch as these are of advantage independently of the leaf spring and pin retainer. Advantage may be taken of lugs of this order, however, to further resist vertical displacement of the retainer pin, and in Figs. 20 to 22 such has been disclosed.

The lugs in the cap, where such are to be used, need not include rearwardly projecting portons, and in Figs. 20 and 22 a modified form of cap, 30C, is shown wherein lugs as 103 and 104 merely include portions that project inwardly of the inner faces of the upper and lower walls of the cap 30C. Such portions in effect constitute extensions of the rear walls of the openings 62C and 63C that are afforded in the upper and lower walls of the cap as in the foregoing embodiments of the invention.

A vertical key-way 108, Fig. 20, is extended through the forwardly projecting nose portion of the adapter 31C, the key-way 108 including a forward vertical wall 108F and a corresponding rear wall afforded by the forward end of a boss 110 within the nose of the adapter 31C. The boss 110 is of reduced dimension with respect to the thickness of the nose of the adapter at this point, and such affords upper and lower seats as 112 in which the lugs as 103 and 104 are adapted to repose when the cap is on the adapter, and when such assemblage has been completed the openings 62C and 63C in the cap are aligned with the key-way 108.

A retainer pin 115 is adapted to be inserted into the key-way 108 of the adapter with the upper and lower ends thereof reposed respectively in the openings 62C and 63C in the cap. The pin is tapered from top to bottom, and the forward face of this pin carries an arcuate leaf spring 116 sprung into spaced apart notches as 115A and 115B in the forward face of the pin 115 so that the arcuate back of the spring is bent in the direction of the forward wall 108F of the key-way 108.

To utilize the lugs 103 and 104 in the tooth cap to resist vertical displacement of the pin from key-way 108, the rear face of the pin includes a rearwardly projecting lug having tapered ends 118A and 118B which are inwardly of the ends of the pin, and the arrangement is such that the lug 118 is adapted to be accommodated between the lugs 103 and 104 of the cap when the pin is in retaining position within the key-way 108.

The spacing between the medial portion of the arcuate back of the spring 116 and the rear face of the lug 118 is somewhat greater than the front-to-rear length of the openings 62C and 63C in the upper and lower walls of the tooth cap. Accordingly, when the pin and attached spring are forced into the key-way 108, the spring undergoes compression between the forward face of the pin and the wall 108F of the key-way which is forwardly thereof. Further insertion of the pin to operative position is facilitated by the lower tapered end 118B of the lug 118 tending to cam the pin forwardly against the return action of the spring 116, and once the lug 118 on the pin has passed beyond the upper lug 103 in the tooth cap the spring 116 expands somewhat to force the upper and lower ends of the pin firmly against the rear walls of the openings 62C and 63C in the tooth cap with the pin lug 118 reposed between the lugs 103 and 104 of the cap.

As in the foregoing embodiments, the spring 116 is effective to draw the cap fully up on the nose of the adapter 31C with forces equally distributed with respect to the center line of the tooth, and in this instance vertical displacement of the pin is resisted by the tapered ends 118A and 118B of the pin lug 118 which will abut the inner faces of the lugs 103 and 104.

Various arrangements may be resorted to for holding the leaf spring to the pin, and in Fig. 21B a modification is illustrated wherein the forward face of the pin at the upper end thereof is notched as at 115N. An arcuate leaf spring 116A is mounted on the forward face of the pin so that the back thereof is bowed in a forward direction, and the upper end of the spring 116A is rigidly mounted in the notch 115N as by a rivet R. The lower end 116C of the spring is free and is preferably reversely bent to facilitate compression of the spring during insertion of the pin into the key-way of the tooth.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A dipper tooth for excavating equipment comprising an adapter having a forwardly projecting nose portion, a removable wear cap having a rearwardly opening socket adapted to mate with said tooth when the cap is mounted on the adapter, a vertical key-way extending through said nose portion of the adapter, a boss within the nose of the adapter inwardly of the forward end of the nose and being of reduced dimension with respect to said nose so as to afford a vertical portion within the adapter in the form of a pair of vertically spaced apart shoulders forwardly of said key-way serving to back up the respective ends of a generally arcuate leaf spring with the back of the spring expanded beyond the boss part way into said key-way, and upper and lower openings in said cap adapted to register with said key-way to enable the ends of a pin driven past the back of said spring into said key-way to repose in the upper and lower openings of the cap, the spring being effective between the forward face of the pin thus inserted in the key-way and said vertical portion within the nose of the adapter forwardly thereof to hold the pin against the rear walls of the openings in the cap.

2. A dipper tooth for excavating equipment comprising an adapter including a forwardly tapered nose portion, a removable wear cap including rearwardly diverging upper and lower walls adapted to mate with the nose of the adapter when the cap is mounted thereon, a vertical key-way through the nose of the adapter, openings at the top and bottom of said cap adapted to register with ends of said key-way when the cap is on the adapter, a pin for the key-way including end portions adapted to repose in the openings in said cap, solid shoulders in the adapter forwardly of the key-way separated by a rearwardly projecting boss formed on the adapter, and a substantially C-shaped leaf spring fitted over said boss and acting between the pin and said shoulders in the adapter forwardly thereof with forces equally distributed with respect to the center line of the tooth.

3. A dipper tooth comprising an adapter having a forwardly projecting nose portion, a removable wear cap having upper and lower rearwardly diverging walls mating with the nose of the adapter when the cap is mounted thereon, a vertical key-way through the nose of the adapter, a boss of reduced dimensions in comparison to the vertical dimensions of the key-way and formed within the nose of the adapter adjacent said key-way to afford spaced vertical shoulders within the adapter serving to back up the respective ends of a generally arcuate C-shaped leaf spring with the arcuate back of the spring normally expanded beyond the boss part way into said key-way along the horizontal center line of the adapter, and upper and lower openings formed in said walls of the cap adapted to register with the ends of the key-way to enable a pin to be driven into the key-way past said spring with the upper and lower ends thereof reposed respectively in the upper and lower openings of the cap, the spring being effective on the medial portion of the pin thus inserted in the key-way to hold the pin against the rear walls of the openings in the cap with a force applied rearwardly along the center line of the adapter.

4. In a retainer element for a dipper tooth comprising a removable wear cap and an adapter for the cap together having registered openings formed therein defining a mounting socket, a leaf spring insertable in said mounting socket and including an arcuate back portion having a more sharply rounded node element medially thereof, said spring having spaced apart sharply rounded end portions substantially centered on either side of the node element at the back of the spring, the sharply rounded end portions of the spring being engageable with portions of the adapter adjacent the opening therein.

5. A dipper tooth for excavating equipment and comprising an adapter having a forwardly projecting and tapered nose portion, a removable and replaceable wear cap including a forward digging end and opposed spaced walls extended rearwardly therefrom to define therebetween a rearwardly opening socket embracing said nose portion, said nose portion of the adapter having a key-way extending therethrough to have opposite ends thereof opening through opposite faces of said nose portion, said opposed walls of the cap each having an opening therein and which openings in the cap respectively are in registry with the opposite ends of said key-way, said nose portion also having a slot formation afforded therein narrower in width than said key-way and in communication therewith through a throat portion and which has opposite ends thereof opening through said opposite faces of said nose portion, said slot formation having a bounding portion on the side opposite said throat portion, said key-way having front and rear bounding portions one of which bounding portions has a pair of shoulders located on opposite sides of said throat portion, unitary spring means narrower than the key-way and disposed in said slot formation with end portions thereof disposed at the opposite ends of said slot formation to be engageable with the inside faces of the marginal portions of the cap adjacent to the openings therein, said spring means additionally having a medially located portion projecting into the key-way through said throat portion, and a removable retainer pin disposed in said key-way with the opposite end portions of the pin disposed in the respective openings in the cap and with marginal portions thereof located in directly opposed facing relation to said shoulders to thereby prevent displacement of the cap from said nose portion, said pin being engaged and held at its medial area by said projecting portion of the spring means, and said pin being effective when so disposed to press the portion of said spring means that lies opposite its projecting portion toward said bounding portion of said slot formation and also to press the portions of the spring means which are disposed at the opposite ends of said slot formation toward said marginal portions of said cap, said pin and said spring means being substantially centered in respect to the assembled cap and adapter parts whereby the retaining forces set up by the co-acting spring means and pin are equally distributed with respect to the horizontal center plane of the assembled parts when oriented in operative digging position.

6. A dipper tooth according to claim 5 wherein the nose portion of the adapter is tapered symmetrically substantially in the form of an isosceles triangle, and wherein the cap is fully complemental thereto and is symmetrical in dimension throughout enabling the cap to be fully reversed on the adapter.

7. A dipper tooth according to claim 5 wherein at least one of the front and rear bounding portions of the key-way is tapered and wherein the pin is likewise tapered so as to be complemental to the taper of the key-way.

8. A dipper tooth for excavating equipment comprising an adapter having upper and lower forwardly converging faces, a removable and replaceable wear cap including a forward digging end and opposed spaced upper and lower walls diverging rearwardly therefrom to define therebetween a rearwardly opening socket embracing an adapter nose portion, said nose portion of the adapter having a vertical key-way extending therethrough to have opposite ends thereof opening through opposite faces of said nose portion, said opposed walls of the cap each having an opening therein and which openings in the cap respectively are in registry with the opposite ends of said key-way, said nose portion also having a vertical slot formation afforded therein narrower in width than said key-way and in communication therewith through a throat portion and which has opposite ends thereof opening through said opposite faces of said nose portion, said slot formation having a forward bounding portion on the side opposite said throat portion, said key-way having a substantially vertically straight rear bounding portion and a top-to-bottom rearwardly sloped front bounding portion defined by sloped shoulders located n opposite sides of said throat portion, unitary spring means narrower than the key-way and disposed in said slot formation with upper and lower end portions thereof disposed at the opposite ends of said slot formation to be engageable with the inside faces of the marginal portions of the cap adjacent to the openings therein, said spring means additionally having a medially located portion projecting rearwardly into the key-way through said throat portion, and a removable retainer pin disposed in said key-way with the opposite end portions of the pin disposed in the respective openings in the cap and with marginal portions thereof located in directly opposed facing relation to said sloped shoulders to thereby prevent displacement of the cap from said nose portion, said pin being engaged and held at its medial part by said projecting portion of the spring means, and said pin being effective when so disposed to press the portion of said spring means that lies opposite its projecting portion toward said bounding portion of said slot formation and also to press the portions of the spring means which are dispsed at the opposite ends of said slot formation toward said marginal portions of said cap, said pin and said spring means being substantially centered in respect of the assembled cap and adapter part whereby the retaining forces set up by the co-acting spring means and pin are equally distributed with respect to the horizontal center plane of the assembled parts when oriented in operative digging position.

9. A dipper tooth according to claim 8 wherein the nose portion of the adapter is tapered symmetrically substantially in the form of an isosceles triangle, and wherein the cap is fully complemental thereto and is symmetrical in dimension throughout enabling the cap to be fully reversed on the adapter.

References Cited in the file of this patent

UNITED STATES PATENTS

| | | |
|---|---|---|
| 796,798 | Blaine | Aug. 8, 1905 |
| 1,247,043 | Warne | Nov. 20, 1917 |
| 2,129,420 | Guy | Sept. 6, 1938 |
| 2,251,169 | Seal | July 29, 1941 |
| 2,325,991 | White | Aug. 3, 1943 |
| 2,427,651 | Baer | Sept. 23, 1947 |
| 2,483,032 | Baer | Sept. 27, 1949 |
| 2,657,482 | Launder et al. | Nov. 3, 1953 |
| 2,702,490 | Launder | Feb. 22, 1955 |

FOREIGN PATENTS

| | | |
|---|---|---|
| 565,417 | Great Britain | Nov. 9, 1944 |